United States Patent
Harsu et al.

(10) Patent No.: US 6,842,627 B2
(45) Date of Patent: Jan. 11, 2005

(54) PORTABLE ELECTRONIC DEVICE MULTIPART HOUSING ELECTRICAL CONNECTION

(75) Inventors: Heikki Harsu, Salo (FI); Onni-Matti Halkola, Salo (FI); Pekka Ekqvist, Turku (FI); King Lau, Salo (FI); Antero Aaltonen, Salo (FI)

(73) Assignee: Nokia Mobile Phones Limited, Espoo (FI)

( * ) Notice: Subject to any disclaimer, the term of this patent is extended or adjusted under 35 U.S.C. 154(b) by 574 days.

(21) Appl. No.: 09/860,787

(22) Filed: May 18, 2001

(65) Prior Publication Data

US 2002/0173334 A1 Nov. 21, 2002

(51) Int. Cl.⁷ .................................................. H04B 1/38
(52) U.S. Cl. ............................... 455/550.1; 455/575.3; 455/90.1; 455/575.5; 379/433.12; 379/433.13; 379/433.05
(58) Field of Search ............................. 455/550.1, 575.3, 455/575.5, 90.1; 379/433.05, 433.12, 433.13; 439/95

(56) References Cited

U.S. PATENT DOCUMENTS 5,267,868 A * 12/1993 Wolff, Jr. ..................... 439/95
5,956,398 A * 9/1999 Weadon et al. ........ 379/433.05
6,091,938 A * 7/2000 Go ........................... 455/575.3
6,421,547 B1 * 7/2002 Frohlund et al. ......... 455/575.3
6,434,404 B1 * 8/2002 Claxton et al. .......... 455/575.3

FOREIGN PATENT DOCUMENTS

| EP | 0 836 308 A1 | 4/1998 |
| WO | WO 98/19434 | 5/1998 |
| WO | WO 00/69150 | 11/2000 |

* cited by examiner

Primary Examiner—Nay Maung
Assistant Examiner—Alan T. Gantt
(74) Attorney, Agent, or Firm—Perman & Green, LLP

(57) ABSTRACT

A portable electronic device comprises a device housing and a housing part arranged to overlie at least a portion of the device housing in a first position and arranged for pivoting movement away from the housing to a second position. A hinge connects the housing and the part for providing the pivoting movement of the part. An electrical connector is provided for electrically connecting at least one electrical component in the part and at least one electrical component in the housing. The electrical connector provides an electrical connection at the first and second positions of the part, but the electrical connection is broken during the pivoting movement of the part. Preferably the portable electronic device comprises a portable communication device such as a radio telephone.

19 Claims, 8 Drawing Sheets

PORTABLE ELECTRONIC DEVICE MULTIPART HOUSING ELECTRICAL CONNECTION

BACKGROUND OF THE INVENTION

1. Field of the Invention

This invention relates to the electrical connection between a main body and the flipping or folding part of a portable communication device.

2. Prior Art

Mobile phones often employ a multipart housing, which folds or uses a flip. Electrical or electronic components are generally located in each part of the housing. In folding or flipping mobile phones, the transceiver housing and the folding or flipping part are conventionally electrically connected to each other with a flex or other type of cable which needs to be threaded through the hinge connecting the respective parts.

Examples of such multipart housings may be found in U.S. Pat. No. 4,845,772 to Metroka et al,; U.S. Pat. No. 4,897,873 to Beutler et al.; U.S. Pat. No. 5,141,446 to Ozouf et al.; U.S. Pat. No. 5,827,082 to Laine; and U.S. Pat. No. 5,661,797 to Leman et al. The aforenoted patents are specifically incorporated by reference herein in their entirety.

Using flex or other types of cable to connect the respective parts of a multipart housing makes the hinge design comparatively large, complex and expensive to manufacture. Such an approach is inherently less reliable than the use of an electrical connector since the repetitive flexing of the cable can cause failure due to bending fatigue.

SUMMARY OF THE INVENTION

There is a need for an improved means and process for electrically connecting the respective parts of a multipart electronic device housing which will allow the use of smaller hinges, be easier to manufacture and be more reliable than prior approaches.

In accordance with a preferred embodiment of this invention a portable electronic device comprises a device housing and a part arranged to overlie at least a portion of the device housing in a first position and arranged for pivoting movement away from the housing to a second position. A hinge connects the housing and the part for providing the pivoting movement of the part. An electrical connector is provided for electrically connecting at least one electrical component in the part and at least one electrical component in the housing. The electrical connector provides an electrical connection at the first and second positions of the part, but the electrical connection is broken during the pivoting movement of the part.

Preferably at least one first contact is supported at a first portion of the housing and is connected to at least one electrical component in the housing. At least one second contact is supported at a second portion of the housing and is connected to at least one electrical component in the housing. At least one third contact is supported by the part and is connected to at least one electrical component in the part. The at least one third contact is arranged to engage the at least one first contact when the part is in the first position and to engage the at least one second contact when the part is in the second position.

Preferably the hinge is arranged to provide for linear movement of the part relative to the housing as well as for the pivoting movement. At least one spring is provided for biasing the part toward the housing at the first and second positions to provide sufficient contact force in the engagement of the at least one first or second contacts with the at least one third contact, at the respective first or second positions.

Preferably the portable electronic device is a portable communication device such as, for example, a mobile or radio telephone.

In accordance with a further preferred embodiment of the invention a process for operating a portable communication device comprises providing a device housing and a part arranged to overlie at least a portion of the housing in a first position. The part is pivoted away from the housing to a second position. An electrical connection is provided between at least one electrical component in the part and at least one electrical component in the housing when the part is at the first or second positions. The electrical connection is broken during the pivoting movement of the part.

This invention is aimed at reducing cost by eliminating the use of a cable running through the hinge. It is also aimed improving the reliability of the electrical connection between the housing and the part in their operative positions.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

This invention is applicable to a wide range of electronic devices which employ multipart housings which fold about a hinge, as for example, notebook computers, hand held computers, PDAs, folding keyboards, or any other electronic device which includes a hinge between folding housing parts and requires electrical signal communication between the parts. Most preferably it is used with portable communication devices such as mobile or radio telephones, which fold or use a flip.

Figure 1:
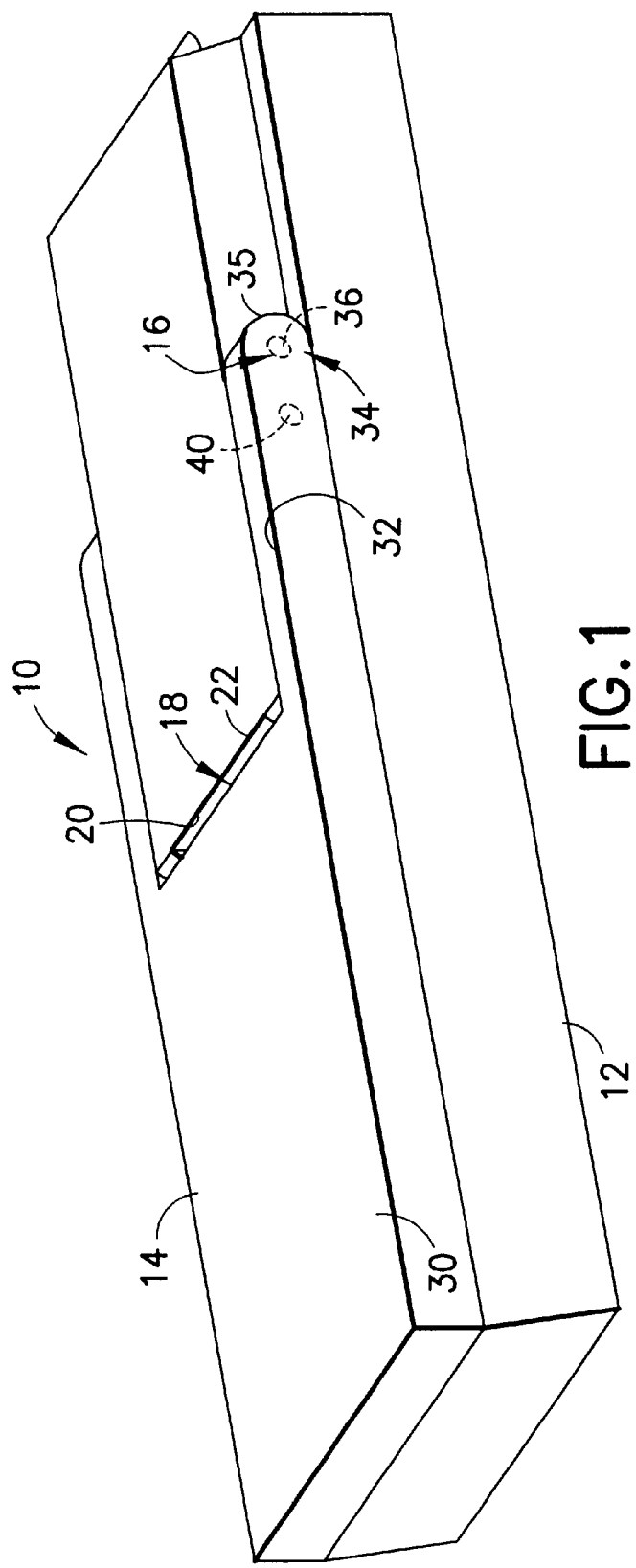
FIG. 1 is a perspective view of a portable electronic device in accordance with a preferred embodiment of the invention.
Figure 7:
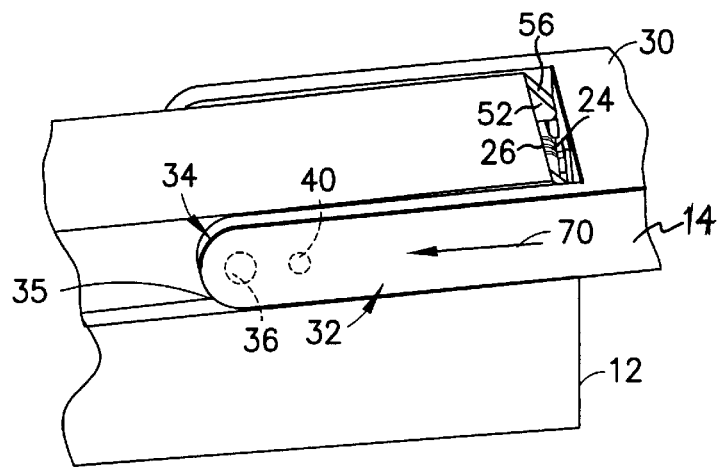
FIG. 7 is a partial perspective view of the portable electronic device of FIG. 1 in the fully detented position of the cover part in the second position away from the device housing.

Referring to FIG. 1, a preferred embodiment of this invention will be described. A radio telephone 10 is comprised of a device housing 12 and a cover or flipping part 14 arranged to overlie at least a portion of the housing 12 in a first position as shown and arranged for pivoting movement away from the housing 12 to a second position as shown in FIG. 7. The housing 12 in this embodiment may support telephone one or more of the following: telephone circuitry, a display, a microphone, a battery, an antenna, keys, or various combinations of these elements. The cover part 14 in this embodiment may support one or more of the following; a speaker, a display, keys, a battery, telephone circuitry, an antenna, or various combinations of these elements.

Figure 2:
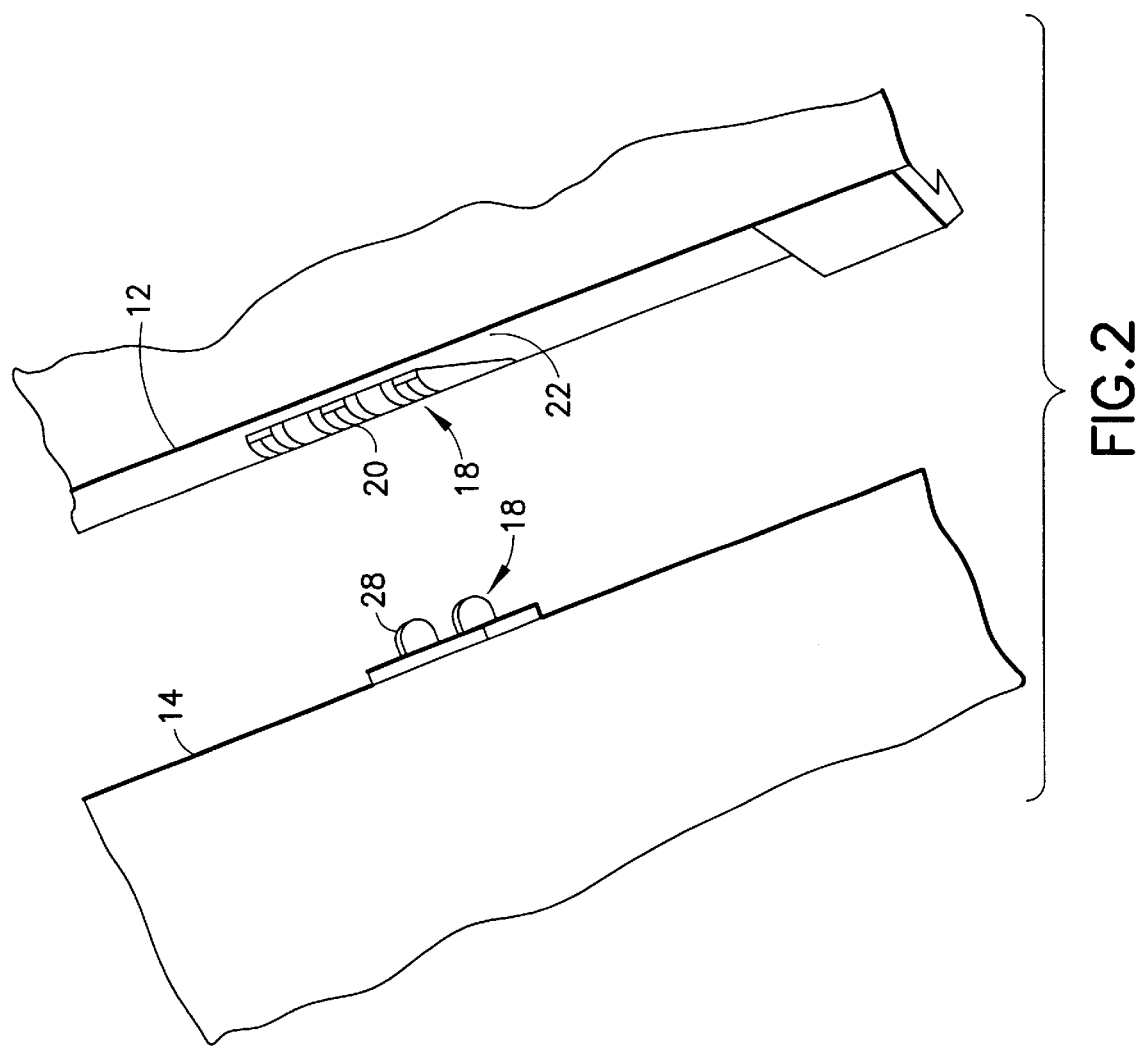
FIG. 2 is a partial perspective view of an electrical connector portion of the portable electronic device of FIG. 1.

A hinge 16 connects the housing 12 and the cover part 14 for providing the relative pivoting movement between the housing 12 and the part 14. Referring now to FIGS. 1 and 2, an electrical connector 18 is used to provide for electrically connection between electrical components (not shown) in the cover part 14 and electrical components (not shown) in the housing 12. The electrical connector 18 of this invention eliminates the need for a flex or cable to be threaded through the hinge 16 between the housing 12 and part 14. It is a unique aspect of this invention that the electrical connector 18, provides the electrical connection substantially only at the first and second positions of the part 14 and breaks the electrical connection during the pivoting movement of the part. This breaking of the circuit permits the connections at the first and second positions to be used in the control scheme of the radio telephone 10 as desired.

Figure 6:
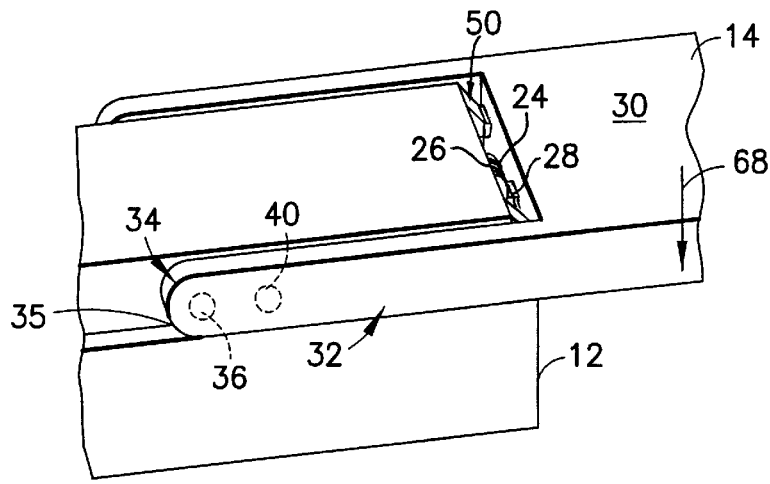
FIG. 6 is a partial perspective view of the portable electronic device of FIG. 1 showing the peak linear position of the cover part upon engaging the detent in the second position away from the device housing.

The electrical connector 18 preferably comprises at least one first contact 20 supported at a first portion 22 of the housing 12 which is connected to at least one of the electrical components in the housing 12. Referring to FIGS. 6 and 7, at least one second contact 24 is supported at a second portion 26 of the housing 12 and is connected to at least one of the electrical components (not shown) in the housing 12. At least one third contact 28 is supported by the cover part 14 and is connected to at least one of the electronic components in the cover part. The at least one third contact 28 engages a one of the at least one first contacts 20 when the cover part 14 is in the first position as in FIG. 1 and engages one of the at least one second contacts 24 when the cover part 14 is in the second position as in FIG. 7. Preferably, the first 20 and second 24 contacts comprise pads and the third contacts 28 comprise projections.

Figure 8:
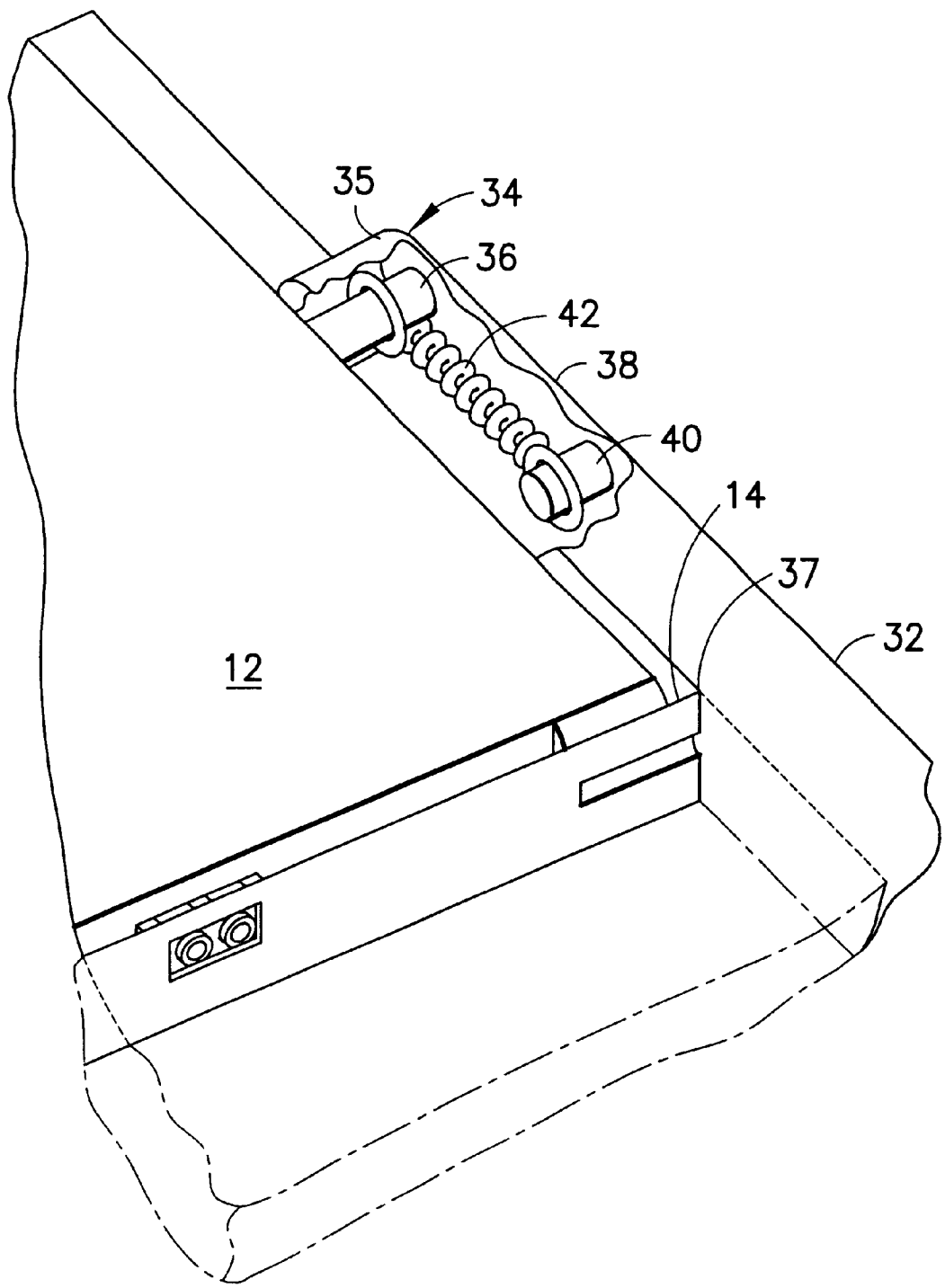
FIG. 8 is a partial perspective view of the portable electronic device of FIG. 1 illustrating a tension spring approach for biasing the cover part into engagement with the device housing to provide contact force in the connector.

Referring to FIGS. 1 and 3–9, in this preferred embodiment the cover part 14 includes a short housing 30 for supporting the one or more electrical components. Two channel shaped elongated arms 32 extend from either side of the short housing 30. The free ends 34 of the arms 32 are capped by a curved end cap 35 and are supported about pins 36 mounted to the device housing 12. As shown in FIG. 8 with a side of the arm 32 cut away, the pins 36 extend into the channel in the arms 32. The channel of the arms 32 is laid side ways so that the sides 37 and curved end cap 35 of the channel can engage the pin 36 and the bottom of the channel 38 serves generally to enclose the pin 36. This portion of the hinge 16 provides for the relative pivoting movement between the cover part 14 and the device housing 12.

The hinge 16 is also arranged to provide for linear movement of the cover part 14 relative to the device housing 12. The linear movement is provided as in FIG. 8 by a second pin 40 supported in each arm 32. At least one spring 42 is provided for biasing the cover part 14 toward the device housing 12 at the first and second positions to provide proper contact force in the engagement between the at least one first 20 or second 24 contacts with the at least one third contact 28, at the respective first and second positions. The spring 42 in FIG. 8 is a tension spring supported about pin 36 at one of its ends and about pin 40 at the opposing end. Linear movement occurs when the arm 32 moves linearly relative to pin 36 which rides in the channel of the arm.

Figure 9:
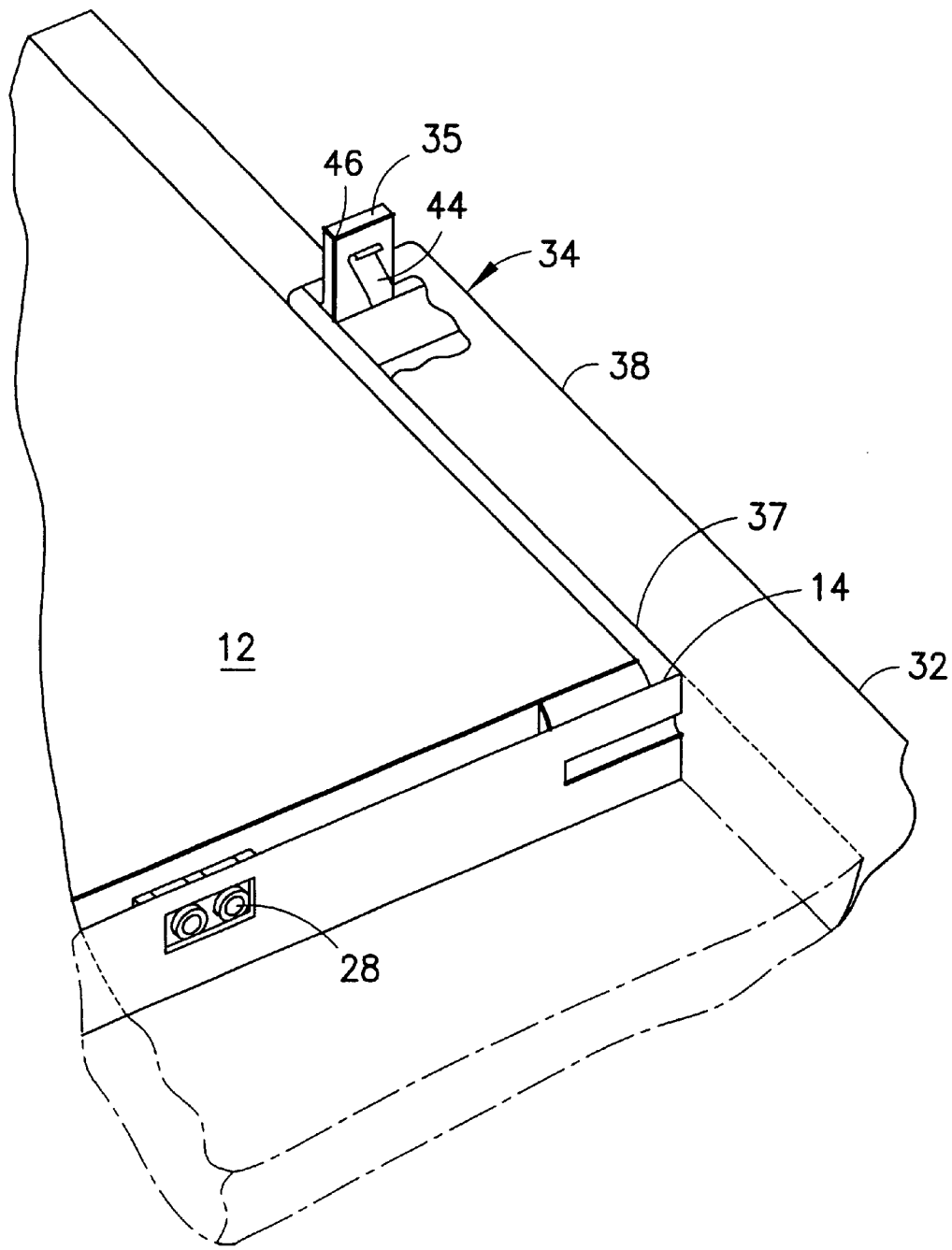
FIG. 9 is a partial perspective view of the portable electronic device of FIG. 1 illustrating a compression spring approach for biasing the cover part into engagement with the device housing to provide contact force in the connector.

While a tension spring is employed in the preferred embodiment of FIG. 8 a compression spring approach as shown in the alternative preferred embodiment of FIG. 9 could be employed in its place. In this approach the pin 40 is eliminated and a convex spring element 44 is supported by a plate 46 in the end cap 35 of the arm 32. The compression spring 44 bears against the pin 36 to provide the desired linear movement and contact force. Linear movement is limited by the maximum deflection of the compression spring 44. A tension spring 42 can provide a greater degree linear movement, however, since the linear movement is only necessary to engage and disengage detents 50 at the first or second positions a compression spring 44 approach is more than adequate. The operation of the hinge 16 with a compression spring 44 is essentially similar to that described with respect to the hinge 16 employing a tension spring.

As shown in FIGS. 3–7 at least one detent 50 is provided between the housing 12 and the part 14 at the first position. and at least one second detent 50 is provided between the housing 12 and the part 14 at the second position. The cover part 14 moves linearly in addition to pivoting as the detents 50 are engaged. The detents 50 comprise at least one rail 52 supported at each of the first 22 and second 26 portions of the housing 12 and at least one projection 54 supported by the cover part 14 for engaging a respective one of the rails 52. When a rail 52 engages the projection 54 it moves the part 14 relative to the housing 12 in a first linear direction and in an opposing linear direction when the detent 50 is fully engaged so that the projection moves past the ramp portion 56 of the rail 52 and slips behind the rail 53. The movement is reversed when the projection 54 is disengaged from a respective one of the rails 52.

In accordance with another preferred embodiment of the invention a process is provided for operating a portable electronic device 10 which comprises: providing a device housing 12 and a cover part 14 arranged to overlie at least a portion of the housing 12 in a first position. The part 14 is pivoted away from the housing 12 to a second position. An electrical connection is provided between at least one electrical component in the part 12 and at least one electrical component in the housing 12 when the part 14 is at the first or second positions. The electrical connection is broken during the pivoting movement of the part 14.

Preferably at least one first contact 20 is provided which is supported at a first portion 22 of the housing 12 and connected to at least one of the electrical components in the housing 12. At least one second contact is provided which is supported at a second portion 26 of the housing 12 and connected to at least one of the electrical components in the housing. At least one third contact 28 is supported by the part 14 and connected to at least one of the electrical components in the part 14. In this preferred process the at least one third contact 28 engages with the at least one first contact 20 when the part is in the first position and the at least one third contact 28 engages the at least one second contact when the part is in the second position. The respective engagements occur upon moving the cover part 14 to the first position or the second position.

Preferably the part 14 is moved relative to the housing 12 as well as pivotally and is biased toward the housing 12 at the first and second positions, to provide the engagement between the at least one first 20 or second 24 contacts with the at least one third contact 28, at the respective first and second positions.

Preferably the process includes providing a first detent 50 between the housing 12 and the part 14 at the first position and a second detent 50 between the housing 12 and the part 14 at the second position and moving the part 14 linearly in addition to pivoting when engaging the detents.

Figure 3:
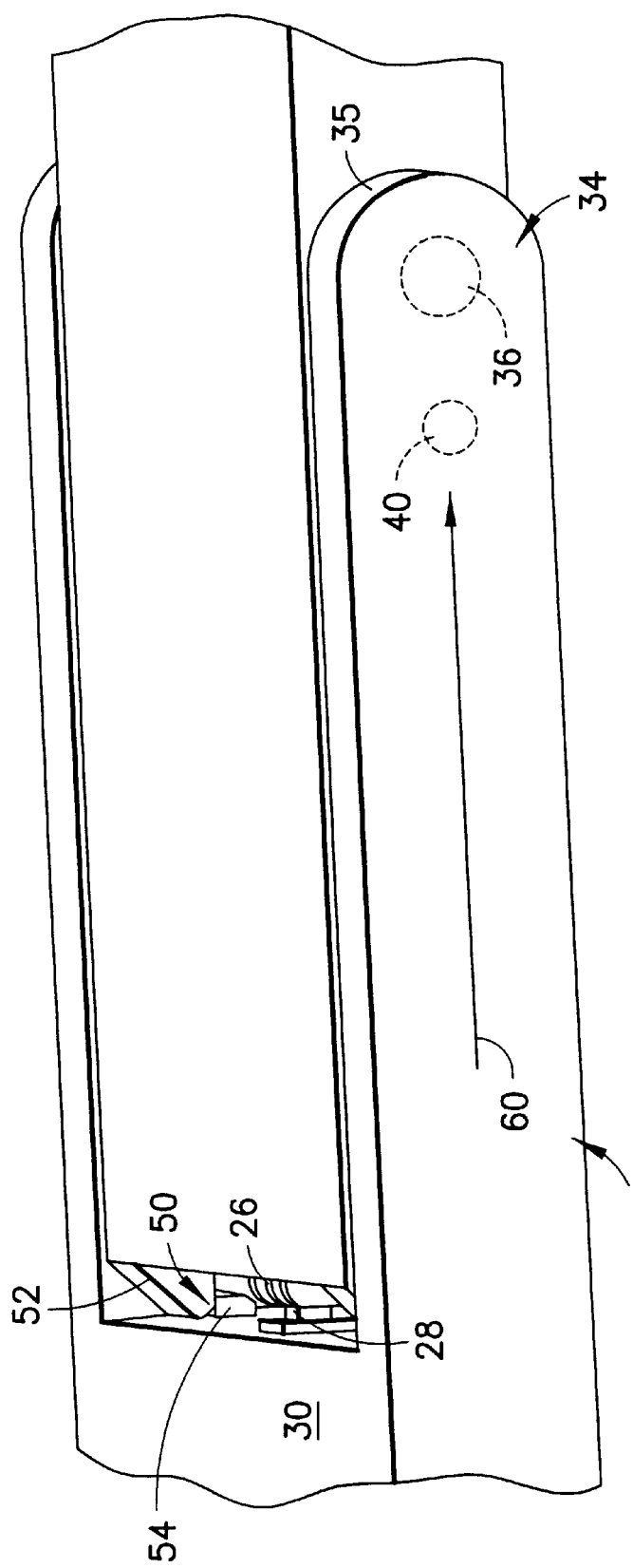
FIG. 3 is a partial perspective view of the portable electronic device of FIG. 1 showing the detail of the detent mechanism.
Figure 4:
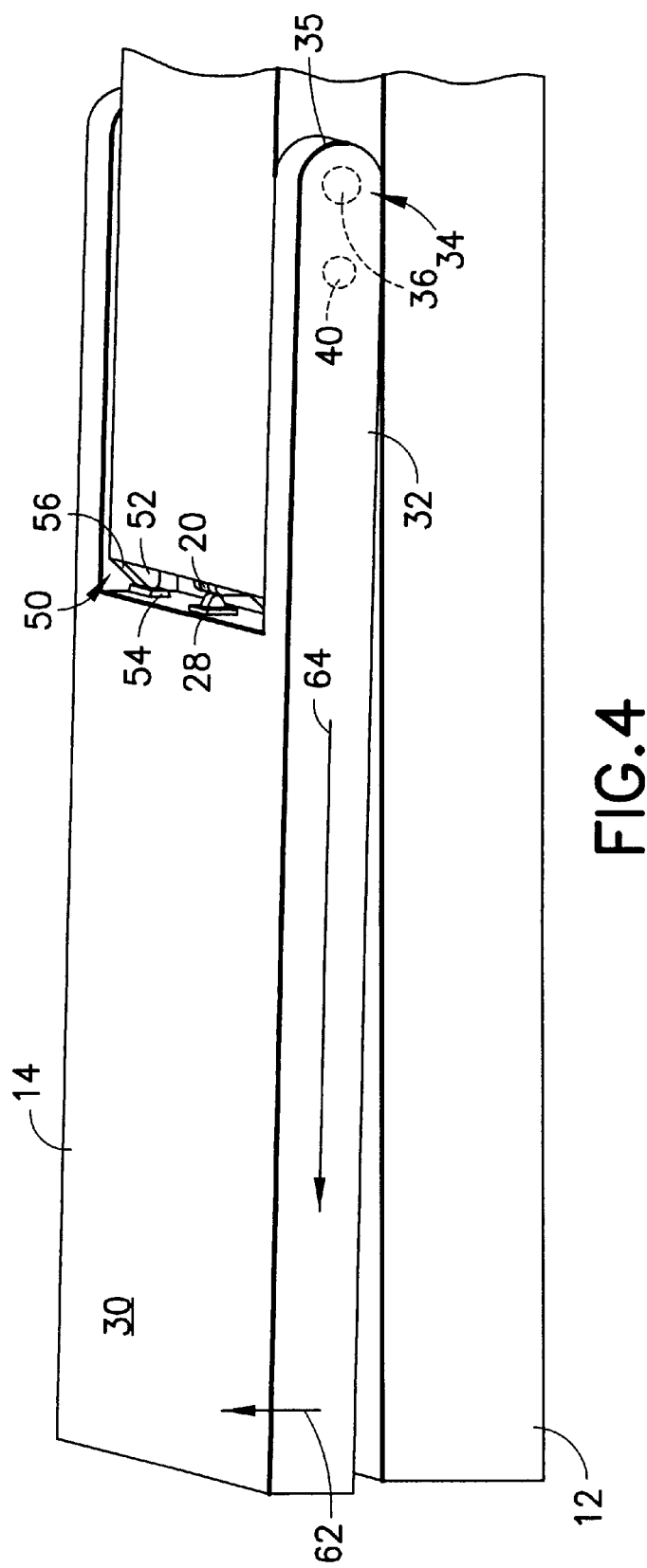
FIG. 4 is a partial perspective view of the portable electronic device of FIG. 1 showing the initial movement of the cover part from the first position wherein it partially overlies the device housing.
Figure 5:
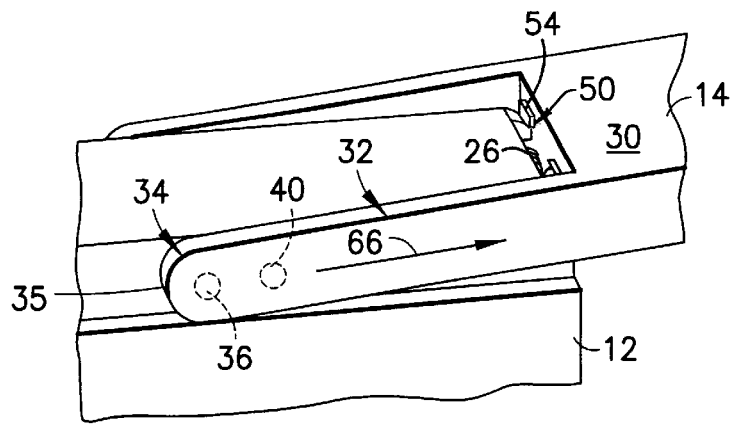
FIG. 5 is a partial perspective view of the portable electronic device of FIG. 1 showing the linear movement of the cover part upon engaging the detent in the second position away from the device housing.

Referring again to FIGS. 3–7 the movement of the cover part 14 relative to the housing will be described in greater detail. In FIG. 3 the cover part 14 is shown in the first position as in FIG. 1. The spring force or biasing direction is shown by arrow 60. As shown in FIG. 4 as the cover part 14 is moved in the direction of arrow 62 away from the device housing 12 the contacts 20 and 28 are opened and the cover part 14 moves linearly in the direction of arrow 64 in order to disengage form the detent 50 at the first position. Referring to FIGS. 5–7, as the cover part 14 pivots to the second position it moves linearly in the direction of arrow 66 as projection 54 moves along the ramp portion 56 of rail 52. The cover part 14 then moves in the direction of arrow 68 of FIG. 6 to fully engage a detent 50. When the detent is being fully engaged as in FIG. 7 the cover part moves in the direction of arrow 70. In the embodiments discussed so far two detent assemblies are utilized, one on each side of the connector 18. Any desired number of detents could be employed.

Figure 10:
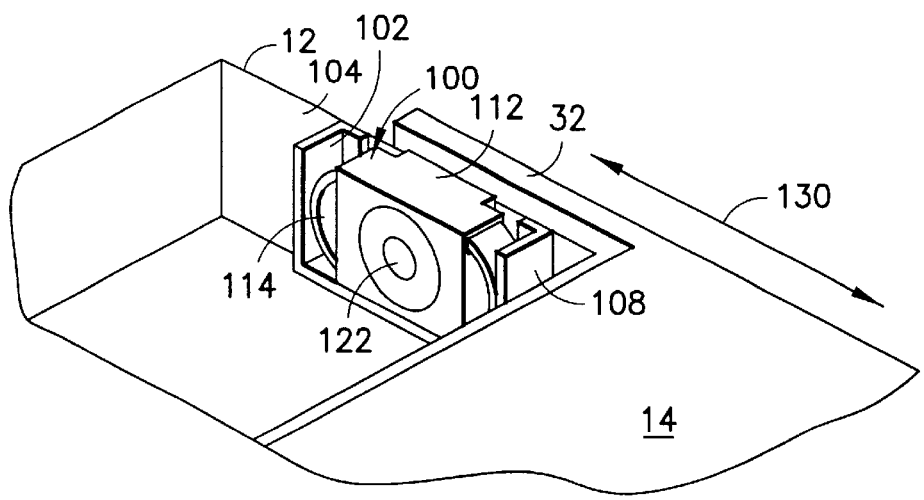
FIG. 10 is a partial perspective view of the portable electronic device of FIG. 1 illustrating a preferred compression spring approach for biasing the cover part into engagement with the device housing to provide contact force in the connector.
Figure 11:
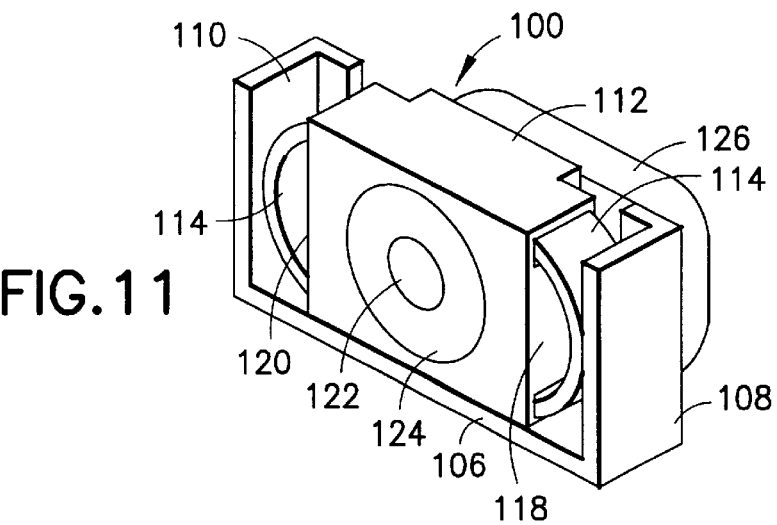
FIG. 11 is a perspective view of the hinge mechanism employed in the embodiment of FIG. 10 viewed from the device housing side.
Figure 12:
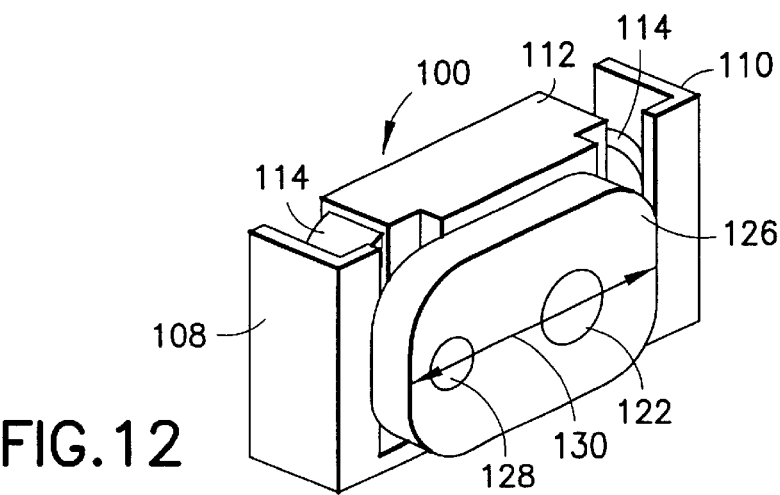
FIG. 12 is a perspective view of the hinge mechanism employed in the embodiment of FIG. 10 viewed from the cover connection side.

Referring now to FIGS. 10–12 a particularly preferred embodiment of a compression type hinge assembly 100 will be described. The hinge 100 comprises a frame 102 which is secured internally of the device housing 12 to a side wall 104 thereof, by any desired means. For example by the use of fasteners or adhesive or the frame can be molded as part of the wall 104. The frame 102 has a "U" shape comprising a bottom wall 106 joining opposing "L" shaped legs or sides 108 and 110. A hinge plate 112 is arranged to slide within the frame 102. A convex curved compression spring 114 is mounted in slots 116 to each of the opposing sides 118 and 120 of the plate 112. A pivot pin 122 is pivotally supported at one end within a bushing 124 mounted to a central portion of the hinge plate 112. The other end of the pin 122 is fixedly mounted to the arm support member 126 toward one end of the support member 126. The support member 126 is nested within the channel of the cover part 14 arms. The channel shaped arm 32 of the cover part is secured to the support member 126 by a fastener or any other desired means. For example, a screw can pass through the arm 32 and be threaded into hole 128 in the support member.

The hinge 100 permits the cover part 14 to rotate about the pivot axis of the pin 122 and to move in either direction as shown by the arrow 130. With this type of compression spring hinge 100 the cover part 14 is able to move in the same manner as discussed with respect to the previous embodiments to ensure adequate contact force between the contacts 20 or 24 and the contacts 28. The use of the two compression springs 114 insures that the cover part can properly navigate the detents 50 when the part is moved to either the first or the second positions.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the spirit and scope of the appended claims.

What is claimed is:

1. A portable electronic device comprising:
   a device housing;
   a part arranged to overlie at least a portion of said housing in a first position and arranged for pivoting movement away from said housing to a second position;
   a hinge connecting said housing and said part for providing said pivoting movement of said part;
   an electrical connector for providing electrically connection between components in said part and components in said housing, said electrical connector providing said electrical connection at said first and second positions of said part, but breaking the electrical connection during the pivoting movement of said part.

2. The portable device of claim 1 wherein said electrical connector comprises:
   at least one first contact supported at a first portion of said housing and connected to at least one of said components in said housing,
   at least one second contact supported at a second portion of said housing and connected to at least one of said components in said housing, and
   at least one third contact supported by said part and connected to at least one of said components in said part, said at least one third contact engaging said at least one first contact when said part is in said first position and engaging said at least one second contact when said part is in said second position.

3. The portable device of claim 2 wherein said hinge is arranged to provide for linear movement of said part relative to said housing as well as for said pivoting movement and further including at least one spring for biasing said part toward said housing at said first and second positions to provide engagement of the at least one first or second contacts with said at least one third contact, at the respective first and second positions.

4. The portable device of claim 3 wherein a first detent is provided between said housing and said part at said first position and a second detent is provided between said housing and said part at said second position and wherein said part moves linearly in addition to pivoting when engaging said detents.

5. The portable device of claim 4 wherein said hinge comprises a first hinge element at one side of said housing and a second hinge element at an opposing side of said housing, and wherein said part includes two opposing arms extending from one side and an opposing side of said part and wherein free ends of said arms are supported for said pivotal and linear movement by said respective first and second hinge elements.

6. The portable device of claim 5 wherein said spring comprises at least one tension spring connected between each of said respective hinge elements and a respective one of said arms.

7. The portable device of claim 5 wherein said spring comprises at least one compression spring arranged to engage each of said hinge elements.

8. The portable device of claim 3 wherein said first and second contacts comprise pads and said third contacts comprise projections.

9. The portable device of claim 4 wherein said detents comprise at least one rail supported at each of said first and second portions of said housing and at least one projection supported by said part for engaging a respective one of said rails to move said part in a first linear fashion when said projection engages said rail and in an opposing linear direction when said projection disengages from the respective one of said rails.

10. The portable device of claim 1 comprising a radio telephone.

11. The portable device of claim 10 wherein said radio telephone comprises a folding telephone wherein said housing comprises a first operative portion of said telephone and said part comprises a second operative portion of said telephone.

12. The portable device of claim 10 wherein said radio telephone comprises a flip phone wherein said housing comprises the principal operative portion of said telephone and said part comprises a flip cover of said telephone.

13. The portable device of claim 1 wherein said components comprise electrical or electronic devices.

14. The portable device, of claim 1 which comprises a portable communication device.

15. A portable communication device comprising:
a device housing;
a part arranged to overlie at least a portion of said housing in a first position and arranged for pivoting movement away from said housing to a second position;
a hinge connecting said housing and said part for providing said pivoting movement of said part;
an electrical connector for providing electrically connection between at least one electrical component in said part and at least one electrical component in said housing, said electrical connector providing said electrical connection at said first and second positions of said part, but breaking the electrical connection during the pivoting movement of said part, said electrical connector comprising:
at least one first contact supported at a first portion of said housing and connected to at least one of said components in said housing,
at least one second contact supported at a second portion of said housing and connected to at least one of said components in said housing, and
at least one third contact supported by said part and connected to at least one of said components in said part, said at least one third contact engaging said at least one first contact when said part is in said first position and engaging said at least one second contact when said part is in said second position.

16. A process for operating a portable electronic device comprising:
providing a device housing;
providing a part arranged to overlie at least a portion of said housing in a first position;
pivoting said part away from said housing to a second position;
providing electrically connection between components in said part and components in said housing when said part is at said first or second positions; and
breaking the electrical connection during the pivoting movement of said part.

17. The process for operating a portable electronic device as in claim 16 wherein said electrical connector comprises:
providing at least one first contact supported at a first portion of said housing and connected to at least one of said components in said housing,
providing at least one second contact supported at a second portion of said housing and connected to at least one of said components in said housing,
providing at least one third contact supported by said part and connected to at least one of said components in said part; and
engaging said at least one third contact with said at least one first contact when said part is in said first position and engaging said at least one second contact when said part is in said second position.

18. The process for operating a portable electronic device as in claim 17 which comprises moving said part linearly relative to said housing as well as pivotally and biasing said part toward said housing at said first and second positions to engage the at least one first or second contacts with the at least one third contact, at the respective first and second positions.

19. The process for operating a portable electronic device as in claim 18 further comprising providing a first detent between said housing and said part at said first position and a second detent between said housing and said part at said second position and moving said part linearly in addition to pivoting when engaging said detents.

* * * * *